No. 804,226. PATENTED NOV. 14, 1905.
H. HENNEN.
HORSESHOE.
APPLICATION FILED JUNE 29, 1905.
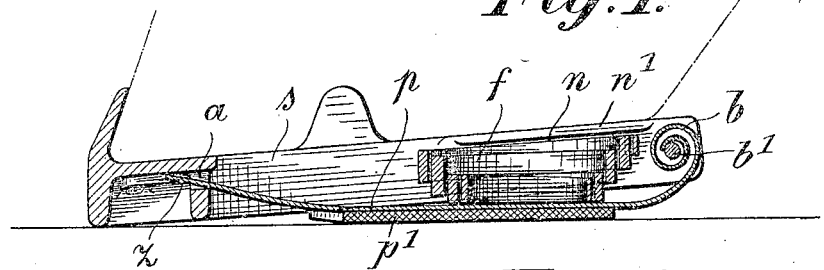
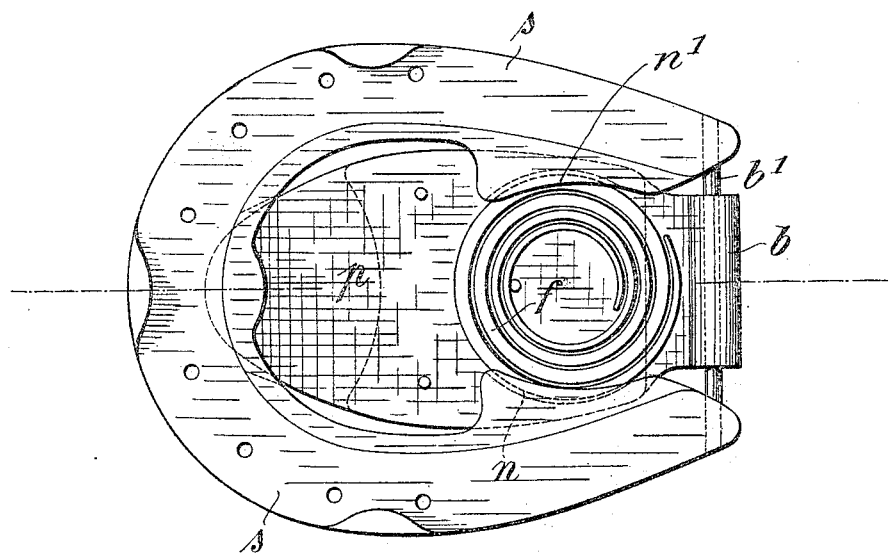
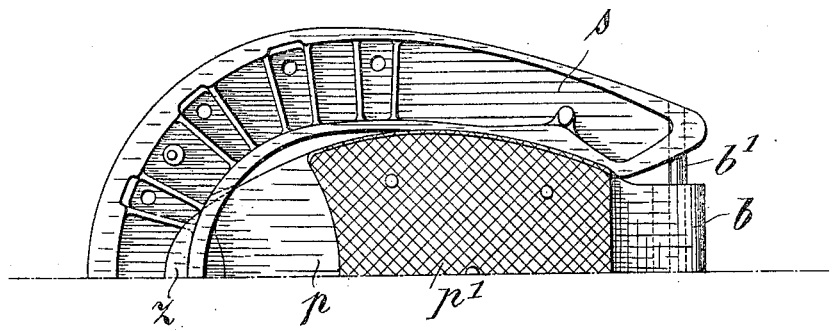
Witnesses:
Arthur Zuncke
William Schulz
Inventor
Heinrich Hennen
by Frank v. Briesen Atty.

UNITED STATES PATENT OFFICE.

HEINRICH HENNEN, OF DÜSSELDORF, GERMANY.

HORSESHOE.

No. 804,226. Specification of Letters Patent. Patented Nov. 14, 1905.

Application filed June 29, 1905. Serial No. 267,660.

*To all whom it may concern:*

Be it known that I, HEINRICH HENNEN, a citizen of the German Empire, residing at Düsseldorf, Germany, have invented new and useful Improvements in Horseshoes, of which the following is a specification.

My invention relates to a horseshoe to which is secured an elastic bottom plate with a volute spring, my object in view being an improvement imparting to the animal an elastic walk, sparing its legs and increasing its endurance and efficiency. While it impedes and affects in no way the setting down of the toe, it works only when the hind part of the hoof is being moved toward the ground, facilitating the lifting of the foot, and thus the walk of the animal. On a slippery road my device prevents the gliding of the hoof on the ground.

In describing my said invention I refer to the drawings herewith, in which—

Figure 1 is a longitudinal section, Fig. 2 a top view, and Fig. 3 part of a bottom view, of my improved horseshoe as secured to the hoof of a horse.

As shown on the drawings, the aforesaid elastic bottom plate $p$ corresponds in shape to the space between the arms $s$ of the horseshoe and is of such width that its main portion may pass up and down between the said arms. On one end it terminates in a tongue or catch $z$, by which it is secured in a recess $a$ near the toe, while its rear end is spirally bent so as to form a sleeve $b$, through which I pass a transverse bolt $b'$, connecting the arm ends of the shoe with each other, the said bolt being secured in such way that it may be removed and set in again at pleasure, thus permitting the removal and exchange of the said plate $p$, while the spiral bend allows a yielding of the plate when the aforesaid volute spring is being acted on. The shanks or arms of the shoe are provided with grooves $n$, that receive the upper end of the volute spring $f$, depending from the shoe between the shanks. The spring is confined to the grooves by projections $n'$ and bears upon the pad or plate $p$. It may be set by inserting and pressing it from below into the said grooves or by opening the arms of the shoe after heating the same, putting in the spring, and closing them again.

The plate $p$ may be provided with a lining $p'$, of india-rubber, felt, or the like, preventing a gliding of the hoof on a slippery road, while the shoe proper may be shaped, as customary and as heretofore provided, with a recess for the admission of a pad or the like, which will likewise contribute to render the walk of the animal elastic.

What I claim as my invention, and desire to protect by Letters Patent, is—

1. The combination with a horseshoe of a volute spring secured in suitable grooves in the arms of the shoe, and an elastic bottom plate, beneath the said shoe, adapted to pass between the two arms by the action of the spring, substantially as described and for the purposes set forth.

2. The combination with a horseshoe of an elastic plate of any suitable material terminating in a tongue on one end by which it is secured in a suitable recess in the shoe near the toe, while the other end is spirally bent forming a sleeve, a removable bolt inclosed by the said sleeve and connecting with each other the two arm ends of the horseshoe, and a volute spring secured between the arms of the said shoe and supported by the said elastic plate, substantially as described and for the purposes set forth.

3. The combination of a horseshoe with an elastic bottom plate supporting a volute spring as herein described and claimed, the said bottom plate being provided with a lining of any suitable material preventing the gliding of the hoof on a slippery road, substantially as set forth.

4. A horseshoe provided with a depending volute spring arranged between and engaging both shanks of the shoe, and with a bottom plate engaged by said spring, substantially as specified.

Signed by me at Düsseldorf, Germany, this 7th day of June, 1905.

HEINRICH HENNEN.

Witnesses:
 WILLIAM ESSENWEIN,
 PETER LIEBER.